United States Patent [19]

Lin

[11] Patent Number: 4,470,921

[45] Date of Patent: Sep. 11, 1984

[54] PROCESS AND POLLUTION-TREATMENT PARTICULATE MATERIAL FOR EFFECTING REMOVAL OF SULFUR OXIDE GASES FROM STACK GASES

[76] Inventor: Ping-Wha Lin, 506 S. Darling St., Angola, Ind. 46703

[21] Appl. No.: 405,242

[22] Filed: Aug. 4, 1982

Related U.S. Application Data

[62] Division of Ser. No. 286,016, Jul. 22, 1981, Pat. No. 4,387,078.

[51] Int. Cl.$^3$ .................. C09K 3/00; C01B 17/00; B01D 53/00
[52] U.S. Cl. .................... 252/189; 423/242; 423/243; 423/244; 106/103; 106/118
[58] Field of Search ............ 252/189; 423/242 A, 423/242 R, 243, 244 A, 244 R

[56] References Cited

U.S. PATENT DOCUMENTS

| | | | |
|---|---|---|---|
| 2,718,453 | 9/1955 | Beckman | 252/189 |
| 3,781,408 | 12/1973 | Lin | 423/244 A |
| 3,855,125 | 12/1974 | Lin | 210/46 |
| 3,976,747 | 8/1976 | Shale et al. | 423/244 |
| 4,171,951 | 10/1979 | Lin | 432/77 |
| 4,276,272 | 6/1981 | Schlager et al. | 252/189 X |
| 4,277,450 | 7/1981 | Dilworth | 423/244 A |
| 4,329,324 | 5/1982 | Jones | 423/244 A |
| 4,397,742 | 8/1983 | Minnick | 423/244 X |

FOREIGN PATENT DOCUMENTS 45-1168 1/1970 Japan .............................. 423/244 A Primary Examiner—Teddy S. Gron
Assistant Examiner—Virginia B. Caress
Attorney, Agent, or Firm—Larry J. Palguta; John A. Young

[57] ABSTRACT

A solid pollution-treatment product consisting of a core material of lime, quicklime or hydrated lime. The core is surrounded by a cracked shell formed of either calcium sulfate or calcium carbonate, such materials being referred to in this and prior applications of inventor by the coined terms "Linfans" and "Linveins", respectively.

The described particulate material is particularly reactive to sulfur oxide bearing gases. Reactivity of such core material is even further enhanced by increasing its porosity through hydration and used in either the hydrated form or a selectively, partially or wholly dehydrated form before exposure to the sulfur oxide pollutants intended to be removed from flue gas or the like.

3 Claims, 6 Drawing Figures

PROCESS AND POLLUTION-TREATMENT PARTICULATE MATERIAL FOR EFFECTING REMOVAL OF SULFUR OXIDE GASES FROM STACK GASES

This is a division of application Ser. No. 286,016, filed July 22, 1981, now U.S. Pat. No. 4,387,078 issued June 7, 1983.

RELATED INVENTIONS

In previously filed related applications and issued patents, I have disclosed, for example, in U.S. Pat. No. 3,781,408 "Air Pollution Control" an improved material for desulfurization described as "Linfans". Linfans consist of a core of porous unspent lime which is surrounded by a cracked shell of calcium sulfate. This material is advantageously reused and recycled for desulfurization.

Similarly, I have disclosed, a new material similar to Linfans but designated as "Linveins" and which consists again of a core of porous unspent lime but instead of surrounded by calcium sulfate, is surrounded by a cracked shell of calcium carbonate which again is useable for desulfurization and is fully disclosed in my now issued U.S. Pat. No. 3,855,125. In my co-pending application Ser. No. 025,910 filed Apr. 2, 1979, I reveal a further new material which is made up of a core of porous hydrated lime having a cracked outer coating of calcium sulfate and useable for desulfurization, this being known as "Linfans H".

In those instances where the hydrated core is subsequently dehydrated, and prior to further reaction, I now designate the dehydrated core which has been previously hydrated, by the coined term "Linfans Q."

It is the use of these previously disclosed designated materials in a new and different manner of the present application, which constitutes the subject matter of this filing.

BRIEF SUMMARY OF THE INVENTION

I use as a starting material, a porous core of calcium oxide, which is surrounded by a cracked shell of either calcium carbonate or calcium sulfate. This is derived by passing lime, quicklime or hydrated lime through a reactor containing flue gases rich in sulfur trioxide. The reaction product is then quenched rapidly in a dry state to effect the described cracked outer shell of calcium sulfate.

The so described material is then hydrated either by water, moist air or steam and is then recycled to the reactor at a selected location which will cause the material to futher react with the sulfur trioxide. The so described reaction product is recycled to the reactor to a preferred location in the reactor so that the thermal shock will produce a particle size of reactant of a desired size. Thus, greater thermal shock is made effective for fracturing the sulfur trioxide-calcium oxide reaction product producing it in even finer form. Conversely less thermal shock will tend to preserve the original size of the sulfur trioxide-removing product. Also the pollution-removing product can be preheated gradually, to minimize the effects of thermal shock change in particle size. Likewise, instead of returning the pollution-removing product in hydrated form, the product can be either partially or wholly dehydrated prior to recycling to the reactor.

An important aspect of the present invention is that the sulfur trioxide gas removal is performed continuously by supplying continuous flow of flue gases rich in sulfur trioxide to the reactor, continuously cycling lime or limestone supply through the reactor, and recycling the reaction products to the reactor.

Also, the gaseous outlet from the reactor may be quenched and hydrated by spraying water, passing the so resulting product through a solid separation system then venting the sulfur trioxide free gas as an effluent and thereafter recycling the quenched product in the form of "Linfans" or "Linveins" for additional passage through the reactor.

As a result of the foregoing, the following qualities of the reaction product which is intended for sulfur trioxide removal are obtained—the reactivity of the core of lime material is greatly enhanced, the porosity of the lime is improved, the surface area to unit volume ratio of the lime is increased, overall effectiveness of desulfurization is enhanced, and the lime is more efficiently utilized for desulfurization thus reducing the amount of lime with its attendant reduction of cost of transportation and volume of waste product. Moreover, the resulting reaction product of calcium oxide and sulfur trioxide, and the sulfur trioxide-removing active ingredient better serves as a plastering material.

"Linfans, Linveins" can also be advantageously used for $SO_2$ removal just as $SO_3$.

BACKGROUND OF THE INVENTION

Briefly, in my air pollution control process, hot product particles released from a lime reactor and used for desulfurization are quenched rapidly. Quenching induces tension at the surface and compression at the center of the particle and the tension causes cracks in the $CaSO_4$ coating of the particle. Furthermore, compression may cause disintegration of the lime core. The particles with lime in the core are coated with cracked $CaSO_4$ coating are called Linfans, and are suitable for desulfurization of stack gas. When Linfans are re-used or recycled for desulfurization, the lime in the core of the particles is easily reachable by the gas containing $SO_x$ through the cracks of $CaSO_4$ coating. When the $SO_x$ in the gas is in contact with the lime in the core of the particle, the following reaction takes place:

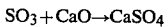

$$SO_3 + CaO \rightarrow CaSO_4$$

The reaction is very rapid and complete. Evidently, the sulfur trioxide is easily removed from the gas diffused into the particle, resulting in high $SO_3$ concentration gradient in the gas in the particle and effecting a high diffusion rate of $SO_3$ through cracks in $CaSO_4$ coating. Thus, the $SO_x$ of the gas in the lime reactor is continuously removed.

It can be seen that the whole desulfurization process involves quenching the hot particles from lime reactor, inducing $CaSO_4$ coating cracks, increasing reactivity of the unspent lime in the core of the particle, and recycling the reactivated lime bearing particles for further desulfurization. The use of Linfans (lime particles coated with cracked $CaSO_4$ coating) for desulfurization has not been achieved or attempted before, and is new.

The production of "Linfans H" material from my desulfurization process can be described as follows: The hot particles from lime reactor used in desulfurization are quenched rapidly by water, steam, pressured steam, or moist air. Quenching with water having high heat capacity and high heat of vaporation will result in the creation of cracks of CaSO₄ coating. As a result, the lime in the core of the particle is reachable by water, steam of moistened air through the cracks. Thus, during the quenching process, hydration of lime also takes place in the core of the particle and the reaction can be expressed as follows:

$$CaO + H_2O \rightarrow Ca(OH)_2, \Delta H = -19.4 \text{ KCal/Mole}$$

The intense chemical heat generated from the hydration process is temporarily prevented from dissipation to the surrounding environment by the heat insulated CaSO₄ coating, thus resulting in a sudden rise of temperature of the interior of the particle, which in turn, causes the particle to expand. The core of the hydrated lime becomes a very porous material, having greater surface area to unit weight ratio and greater reactivity. The particles having a porous hydrated lime core and cracked CaSO₄ coating can be advantageously used for desulfurization of stack gas; for the hydrated core of of the particle is reachable by the gas containing SO$_x$ through the cracks of CaSO₄ coating. In a hot-dry desulfurization process, when the particles are added to a hot reactor environment, dehydration of hydrated lime in the core of the particle takes place according to the following formula:

$$Ca(OH)_2 \rightarrow CaO + H_2O, \Delta H = 19.4 \text{ KCal/Mole}$$

It can be seen that after the water is driven from the hydrated lime lattice in the dehydration process, the resulting quicklime in the core of the particle is even more porous than that of the original hydrated lime, and is also more reactive with SO$_x$ in the desulfurization process. The rate of dehydration is expected to be rapid, for the rate of dehydration is dependent on the sizes of hydrated lime grains in the core of the particle and on the temperature in the lime reactor enironment. The smaller the size of hydrated lime grain and the higher the temperature of the lime reactor environment, the faster the dehydration rate will be.

From the described process for producing Linfans H material and for desulfurization it can be seen that it involves quenching, hydration, and dehydration in sequence, and one of the new materials has a coined name "Linfans Q." Linfans Q has very porous quicklime core coated with cracked CaSO₄ coating. This material had never been used previously for desulfurization of stack gas before, and is very effective in SO$_x$ including SO₂, SO₃ removal. The mechanism of desulfurization by "Linfans H" and its modified form "Linfans Q" are the same as that by Linfans explained previously.

"Linveins" material, i.e. calcium oxide coated with fractured CaCO₃ coating can also be used for desulfurization. When "Linveins" material is added to the gas containing SO₃, the CaCO₃ reacts with SO₃ to become CaSO₄ according to the following equation:

$$SO_3 + CaCO_3 \rightarrow CaSO_4 + CO_2$$

This reaction takes place on the surface of the CaCO₃ coating. SO₃ in the gas can seep through the cracks of "Linveins" to react with CaO in the core to form CaSO₄, and the mechanism of SO$_x$ removal is similar to "Linfans".

Desulfurization by "Linveins" can also be achieved after the calcium oxide core is hydrated to become porous hydrated lime, and the desulfurization process involves quenching, hydration, dehydration, lime reaction with SO$_x$. The mechanism is the same as that in the desulfurization with hydrated lime coated with thermal shock fractured CaSO₄ coating explained previously.

When "Linfans" or "Linveins" particles, having either quicklime or hydrated lime core coated with CaSO₄ or CaCO₃ coating, are applied to a hot reactor environment for desulfurization, the sudden heat shock may induce fragmentation of the lime core and result in more porous lime. However, heating also causes the particle to expand, and if the CaSO₄ or CaCO₃ coating strength is weak, the particle will disintegrate into many tiny particles. This may present material transportation and solid material separation from the gas problems which may be undesirable in many cases. In order to prevent this, heating the particles gradually or by stages to the reactor temperature inside or outside the reactor before desulfurization is the solution.

Linfans, Linfans H, Linfans Q, and Linvein can be efficiently used for SO₂ removal in other dry scrubbing processes. When they are added to the flue gas containing SO₂, SO₂ diffuses through the cracks of either CaSO₄ or CaCo₃ shell to react with lime core according to the following formula:

$$SO_2 + CaO \rightarrow \alpha CaSO_4 + \beta CaSO_3 + \gamma CaS$$

The extent of CaSO₄, CaSO₃, and CaS in the reaction product depends on reaction temperature. However, in a high temperature environment, most of the resulting product is CaSO₄. Since the chemical heat generated from this reaction is high, and can not be easily dissipated within the shell, therefore, the resulting product from the chemical reaction is expected to be CaSO₄. The reaction mechanism of SO₂ removal in the particle having a cracked shell is the same as that of SO₃ removal which has been explained previously.

DETAILED DESCRIPTION OF EMBODIMENT OF FIG. 1

Figure 1:
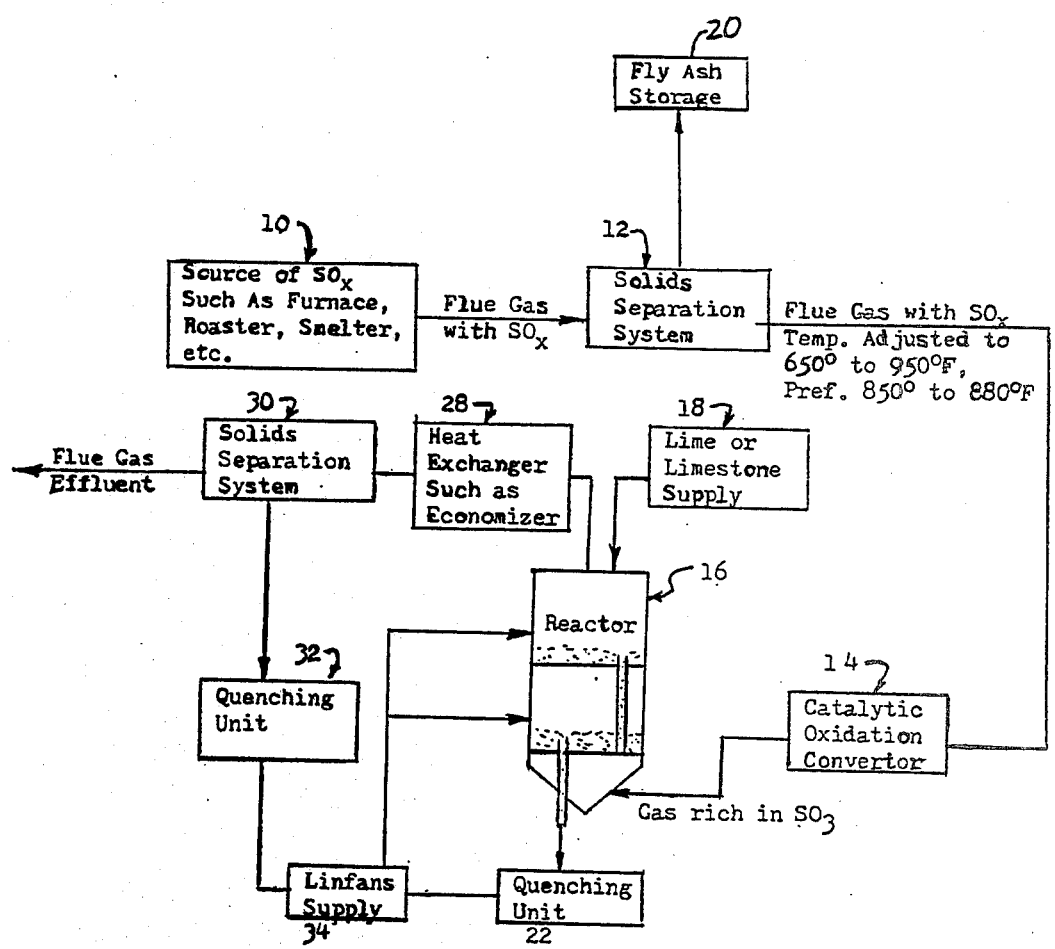
FIG. 1 is a schematic view illustrating the complete process for production of "Linfans" material, consisting of cracked CaSO₄ coating with a lime core useable for recycling the material for desulfurization in the manner indicated.

In FIG. 1 are shown a source of SO$_x$10 which can be a furnace, ore roaster, smelter, etc. The gas from the source of SO$_x$10 contains SO₂, SO₃, and suspended solid particles. The gas is passed through a solids separation system 12 which can consist of electrostatic precipitators, filters, or others. The solid separation system should have nearly 100% solid removal efficiency, particularly with regard to those particles which may poison catalysts in the catalytic oxidation convertor 14.

Separated fly ash particles are collected, quenched, if desired, and sent to a storage bin 20 for future use.

When vanadium catalyst is used, the flue gas is cleansed of suspended particles, and is then temperature regulated or adjusted to 650° F. to 950° F., preferably to between 850° and 880° F. The catalytic conversion from $SO_2$ to $SO_3$ is expressed by the following reaction:

$$SO_2(g) + \tfrac{1}{2}O_2(g) \rightarrow SO_3(g)$$

The flue gas rich in $SO_3$ from catalytic convertor 14 flows countercurrent with lime, and the following reactions take place in the reactor 16:

$$SO_3(g) + CaO(s) \rightarrow CaSO_4(s) \Delta H = -96K \text{ cal/mole}$$

or $$SO_3(g) + H_2O(g) \rightarrow H_2SO_4(g)$$

$$H_2SO_4(g) + CaO(s) \rightarrow CaSO_4 + H_2O(g)$$

Lime is fed into the reactor 16 from lime supply 18. Since the chemical heat generated from the chemical reactions in the reactor 16 is very high (96K cal/mole) the heat can be advantageously employed for calcination in some cases. Therefore, limestone can be used as a substitute for lime if $SO_3$ concentration in the incoming gas to lime reactor 16 is high.

Figure 1A:
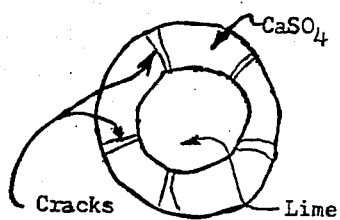
FIG. 1A is a cross sectional view of Linfans.

The solid particles from reactor 16 are quenched in a dry state in quenching unit 22, and the resulting product, "Linfans", FIG. 1A, is collected in "Linfans" storage 34.

The exit gas from lime reactor is first passed through a heat exchanger 28 such as economizer, and then a solids separation system 30. The effluent flue gas is free from solid particles and $SO_x$. The solid particles from solids separation system 30 is quenched in a dry state in a quenching unit 32, and the resulting particles from quenching unit 32 is "Linfans" which is also collected in "Linfans" storage 34.

"Linfans" is recycled to lime reactor 16 at different points as desired. If a multi-stage fluidized reactor is employed, in order to prevent thermal shock, "Linfans" can be fed to the upper stage or cold zone of the reactor. As "Linfans" flows downward from upper stage or lower stage, it extracts heat from the counter-current gas and is heated gradually or by stages. On the other hand, if thermal shock is desired for the reason of causing "Linfans" particles to disintegrate or of making the lime core of the particles more porous, "Linfans" can be applied to the reactor at lower stage or hot zone.

FIG. 1A is diagrammatic cross-sectional view of "Linfans" which has unspent lime in core coated with cracked $CaSO_4$ coating.

DETAILED DESCRIPTION OF EMBODIMENT OF FIG. 2

Figure 2:
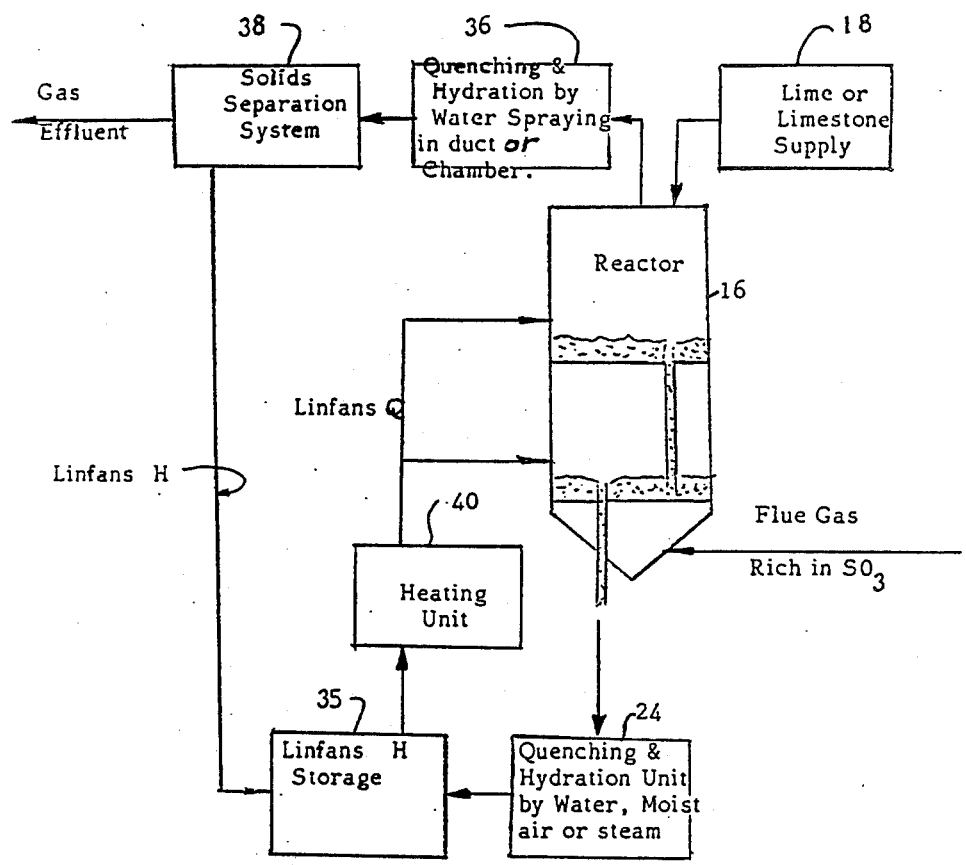
FIG. 2 is a schematic view showing the process for producing "Linfans Q", a coating of cracked CaSO₄ over porous lime, and for recycling the material for desulfurization.

In FIG. 2, the gas rich in $SO_3$ reacts with lime in reactor 16, the solid particles from reactor 16 are quenched and hydrated by water, moist air, steam or pressured steam, in quenching and hydration unit 24, and the resulting product, "Linfans H" (FIG. 2A) is collected in "Linfans H" storage 35. The solid particles in the exit gas from lime reactor 16 are quenched and hydrated by fine spray in a duct or a chamber 36, and then separated from the gas in a solids separation system 38. The separated solids is "Linfans H", and is collected in "Linfans" storage 35. "Linfans H" can be recycled from "Linfan" storage 35 to different points of lime reactor 16 as desired. Alternatively, it can be recycled to the reactor 16 after it is heated in a heating unit 40 to a desired temperature, and the dehydrated particles, "Linfans Q", from the heating unit has a very porous lime core.

Figure 2A:
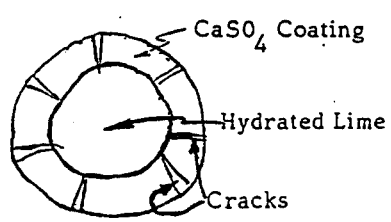
FIGS. 2A and 2B are cross sectional views of Linfans H and Linfans Q.
Figure 2B:
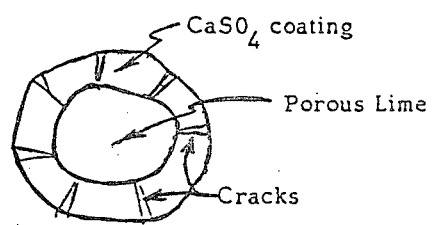

FIG. 2A shows diagrammatic cross-sectional view of "Linfans H" particle which has hydrated lime in core coated with cracked $CaSO_4$ coating. FIG. 2B shows a diagrammatic cross-sectional view of Linfans Q which has very porous lime core coated with cracked $CaSO_4$ coating.

DETAILED DESCRIPTION OF EMBODIMENT OF FIG. 3

Figure 3:
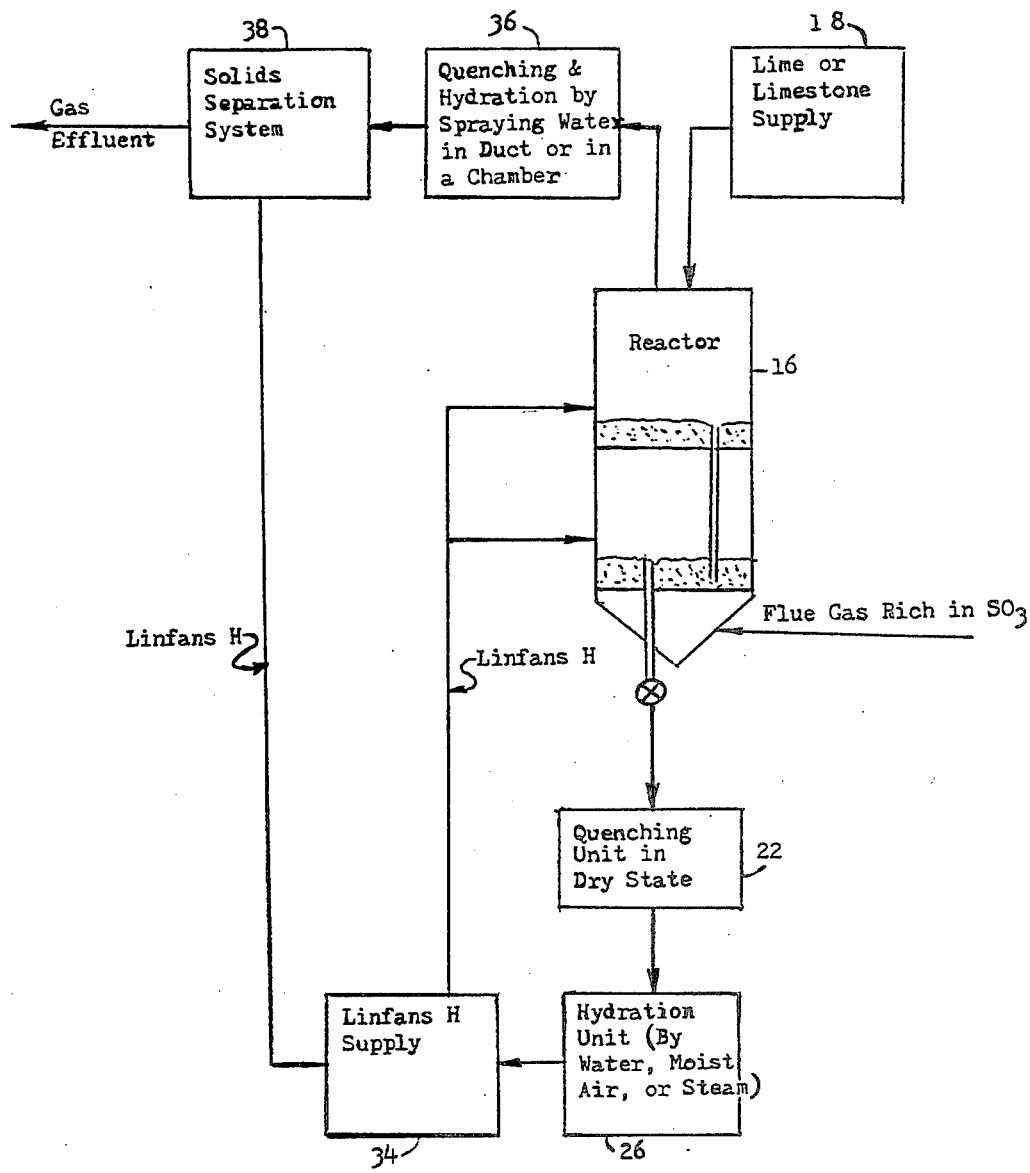
FIG. 3 is a schematic view showing the process for producing "Linfans H", a coating of cracked CaSO₄ and a core of hydrated lime, and for recycling the material for desulfurization.

In FIG. 3, the solid particles from lime reactor are first quenched in quenching unit 22 in a dry state and then hydrated by water, moist air, steam or pressured steam in hydration unit 26. Hydration can also be achieved by prolonged storage. The resulting product from hydration unit is Linfans H, having hydrated lime core coated with cracked $CaSO_4$ coating.

The solid particles in the exit gas lime reactor are quenched and hydrated by fine spray of water in a duct or a chamber 36, and then separated from the gas in a solids separation system 38. The application of fine spray of water to the gas cools at the same time also the gas, thus, reduces the volumetric flow rate of the gas, and reduces the volume of the gas to be handled by the solids separation system. Furthermore, the water picked up by the solid particles tends to increase the conductivity of the particles, making them easy to be removed in an electrostatis precipitator. The desired temperature of effluent flue gas is about 300° F.

The solid particles from solids separation system are Linfans H and are also collected in Linfans H storage 34. Linfans H can be recycled from Linfans H storage 34 to different points of lime reactor 16 for desulfurization after it is heated gradually or by stage in a heating unit 40 to a desired temperature. Linfans H can also be heated by stages in the reactor 16, depending on equipment and process design.

DETAILED DESCRIPTION OF SPECIFIC WORKING EXAMPLE

Two materials, Linfans 1A (LF-1A) and Linfans Q 1A (LF-Q-1A) has been used for desulfurization experiment. LF-1A was produced by reacting high calcium lime with gas rich in $SO_3$ at 880° F. for 40 minutes in a tube reactor, and then quenched rapidly in air, while LF-Q-1A was produced in the same manner except that it was quenched and hydrated by a fine spray of water and then dehydrated in an oven at 880° F. for 30 minutes. LF-1A is calcium oxide coated with fractured $CaSO_4$ coating, and LF-Q-1A is porous calcium oxide coated with fractured $CaSO_4$ coating.

The desulfurization experiments were conducted also in the tube reactor by reacting LF-1A and LF-Q-1A respectively with the gas rich in $SO_3$ at 880° F. for 40 minutes. The chemical compositions of the Linfans materials were determined before the desulfurization and after the desulfurization, and the results are shown in the following Table 1:

TABLE 1

Chemical Composition of Linfans 1A(LF-1A),
Linfans Q 1A(LF-Q-1A) Before and After the Desulfurization

| Chemical Used | Desulfurization | Chemical Composition | | | CaO Conversion |
|---|---|---|---|---|---|
| | | Lime as CaO | CaSO$_4$ | Others | |
| Linfans 1A (LF-1A) | Before Used for | 59.8% | 36.8% | 3.4% | 20.3% |
| | After Used for | 25.9% | 70.0% | 3.2% | 53% |
| Linfans Q 1A (LF-Q-1A) | Before Used for | 61.1% | 35.2% | 2.7% | 19.2% |
| | After Used for | 10.1% | 88.2% | 1.7% | 72.0% |

From the table, it can be seen that the Linfans materials are highly reactive with SO$_3$, and the CaO conversion was increased from 20.3% to 53% for LF-1A, and 19.2% to 72% for LF-Q-1A, resulting in much greater utilization of CaO than ordinary lime for desulfurization. Evidently, the Linfans materials can be reused or recycled advantageously for desulfurization.

INDUSTRIAL APPLICATION

The invention is usable for removing sulfur oxides as a pollutent ingredient in stack gases by satisfactory treatment with an activated core of lime, having a cracked coating, calcium oxide, or calcium sulfate. The pollutent treating materials is used for rendering stack gases virtually pollution free.

CONCLUSION

I have ameliorated a serious problem of air pollution, SO$_x$ removal from stack gas, in an economical and efficient manner, and satisified a long-standing need for a commercially acceptable system for air pollution control. However, the process is not to be construed as limited to the particular forms described herein, since these are illustrative rather than restrictive. For example, chemicals other than CaO may be used to stabilize at least one of SO$_2$ and SO$_3$ gases to form stable, nongaseous chemical product which can be easily disposed. Magnesia, MgO, closely resembles CaO, is almost invariably present in commercial lime. It reacts with SO$_2$, SO$_3$ to form MgSO$_4$ just like CaO. An electron beam instead of chemical catalyst can be used for conversion of SO$_2$ to SO$_3$.

Although the present invention has been illustrated and described in connection with a few selected example embodiments, it will be understood that they are illustrative of the invention and are by no means restrictive thereof. It is reasonable to expect that those skilled in this art can make numerous revisions and adaptations of the invention and it is intended that such revisions and adaptations will be included within the scope of the following claims as equivalent of the invention.

What is claimed is:

1. An active pollution-treatment ingredient in the form of a solid particulate material for effecting removal of sulfur oxides from flue gas, consisting of an outer cracked shell of calcium sulfate, and a core consisting of quicklime comprising a very porous core material as a result of the core material, while surrounded by the outer cracked shell, having been hydrated and dehydrated through a controlled hydration and dehydration process which maintains the core material within the core of the particulate material and the hydration effected by the controlled provision of moisture in the form of steam, moist air or sprayed water.

2. The active pollution-treatment particulate material in accordance with claim 1, wherein the reaction product is characterized by an increased proportion of calcium sulfate to calcium oxide after exposure to the sulfur oxide gases.

3. The active pollution-treatment particulate material in accordance with claim 1, wherein said ingredient is characterized by cracks of the outer cracked shell permitting diffusion of sulfur oxide gases through the cracks into the core during reaction in a reactor.

* * * * *